No. 650,289. Patented May 22, 1900.
C. S. WINSOR & O. E. J. SMITH.
SOLDERING MACHINE.
(Application filed Dec. 14, 1899.)
(No Model.) 3 Sheets—Sheet 2.
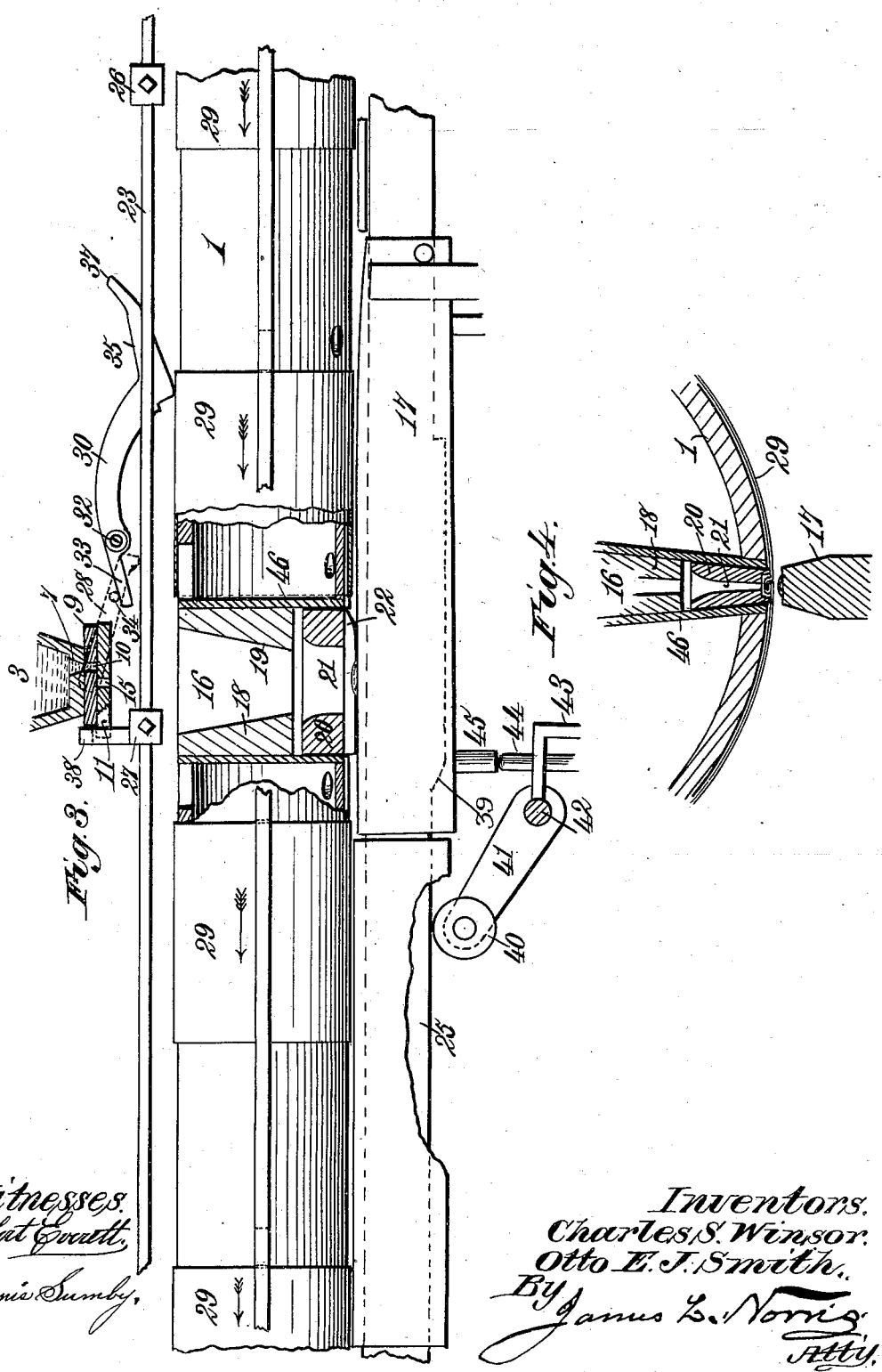
Witnesses
Inventors.
Charles S. Winsor.
Otto E. J. Smith.
By James L. Norris
Atty.

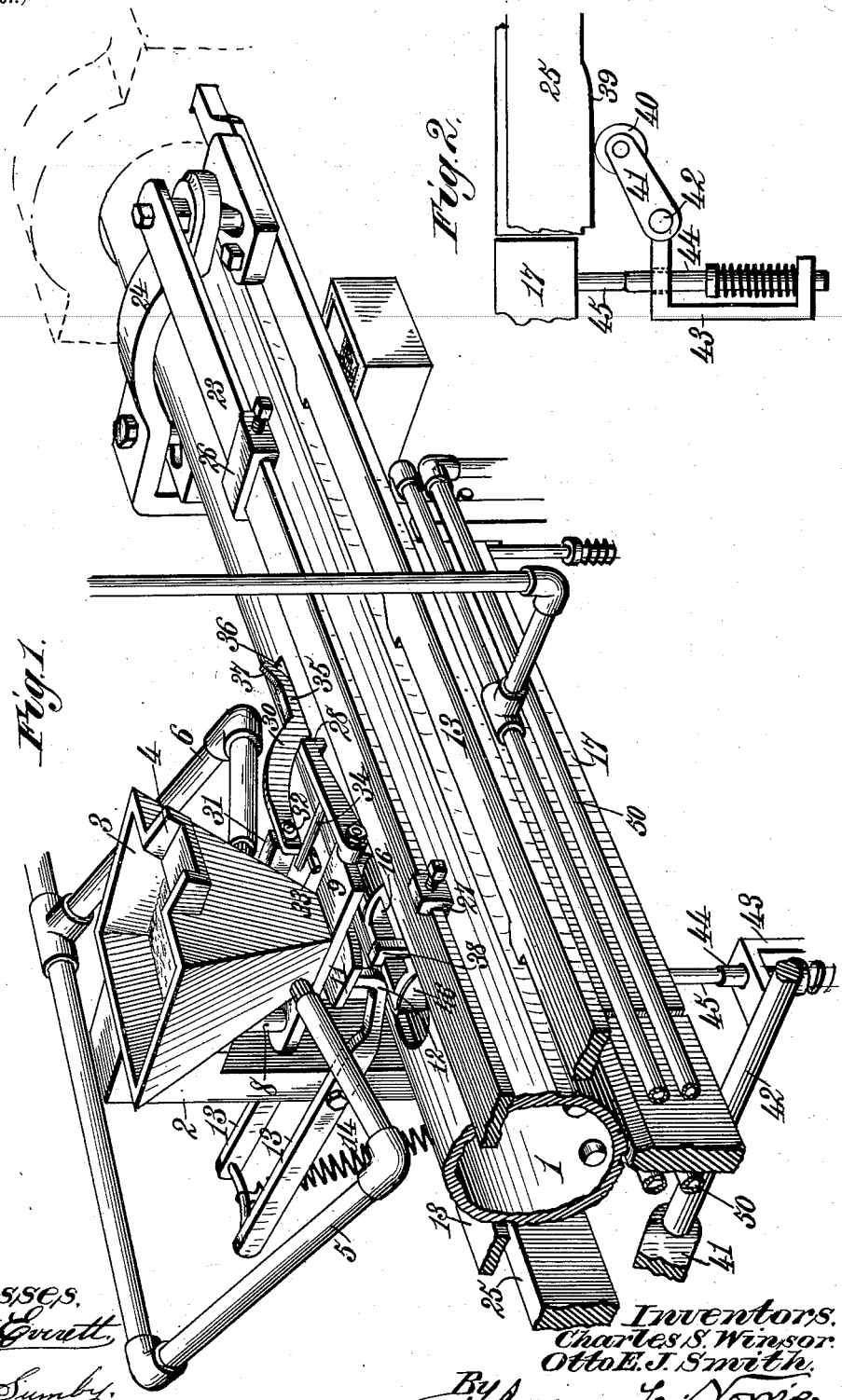

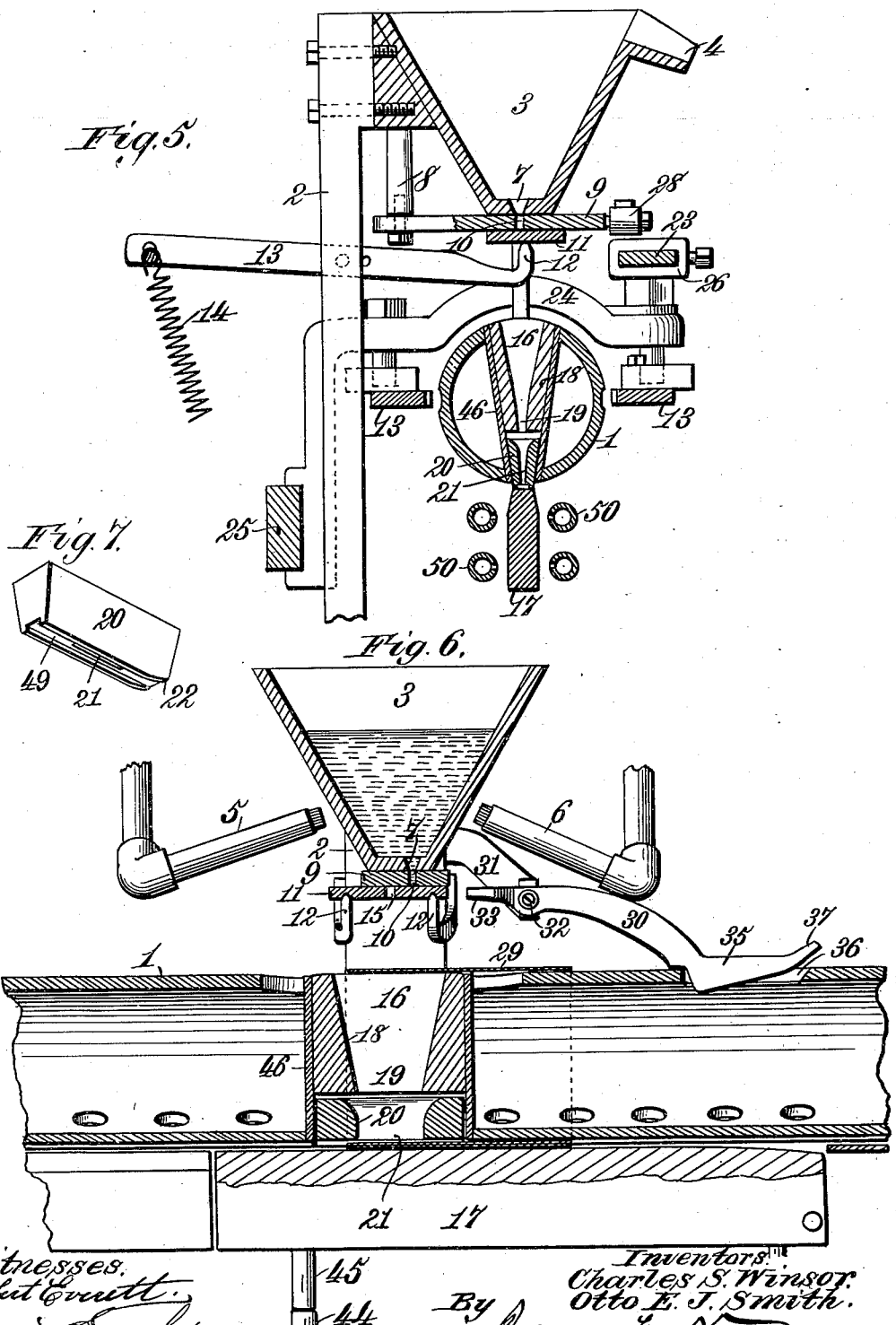

UNITED STATES PATENT OFFICE.

CHARLES S. WINSOR AND OTTO E. J. SMITH, OF SAN FRANCISCO, CALIFORNIA, ASSIGNORS TO ROBERT D. HUME, OF GOLD BEACH, OREGON.

SOLDERING-MACHINE.

SPECIFICATION forming part of Letters Patent No. 650,289, dated May 22, 1900.

Application filed December 14, 1899. Serial No. 740,347. (No model.)

*To all whom it may concern:*

Be it known that we, CHARLES S. WINSOR and OTTO E. J. SMITH, citizens of the United States, residing at San Francisco, in the county of San Francisco and State of California, have invented new and useful Improvements in Soldering-Machines, of which the following is a specification.

This invention relates to machines for soldering the side seams of sheet-metal can-bodies.

The object of the invention is to do away with the use of solder-wire and with mechanism for feeding and cutting the same. By using a reservoir of melted solder instead of such wire a reduction is obtained in the cost of soldering and at the same time a greater speed in operation can be used.

In the following description and in the accompanying drawings the invention is embodied in an apparatus which comprises a solder-pot in which solder is melted and which is elevated above the horn or other support along which the can-bodies are propelled. The soldering-pot is provided with an automatically-acting feed and cut-off by means of which a regulated quantity of solder is supplied either to the seam or to a soldering-iron in contact with which the same is moved along. The device as shown and described is supposed to be used in connection with such a machine as is illustrated in the patent to Robert D. Hume for a can-soldering machine, No. 640,136, dated December 26, 1899. In this patent is shown a horn, beneath which is a soldering-iron, and which is provided with a slot or passage through which small pieces of solder-wire are delivered to the upper edge of the iron and thence transferred to the seam which is presented on the lower side of the horn. Used with such a construction the present apparatus drops melted solder through such a slot in the horn upon the upper edge of such an iron. With an apparatus in which the seam is presented upon the upper side of the horn the device herein described would drop melted solder directly upon such seam.

For a full comprehension of the invention as herein described reference must be made to the accompanying drawings, in which—

Figure 1 is a perspective view of our apparatus. Fig. 2 is a detail view illustrating the mechanism for actuating the soldering-iron. Fig. 3 is a side elevation, partly in section, of the horn and certain parts coöperating therewith. Fig. 4 is a detail cross-sectional view of the horn through the hopper therein, showing a can thereon in position to be soldered. Fig. 5 is a cross-section through the solder-pot and the hopper in the horn. Fig. 6 is a longitudinal section through the same. Fig. 7 is a detail perspective view.

1 represents the horn of a cross-section corresponding to that of the can-bodies, upon which such can-bodies are propelled along. The bodies are complete, except that their side seams are not soldered. To any suitable stationary structure, such as the standard 2, is secured a solder-pot 3, which is preferably of a downwardly-tapering shape, as shown, so as to form a contracted bottom. The projecting lip 4 in the edge of the pot is to make it convenient to remove dust from the surface of the melted solder in the pot. The solder-pot is elevated, so as to be supported directly above the horn. It is heated and solder melted within it by any suitable arrangement of gas pipes and burners, such as those shown at 5 and 6. In the bottom of the pot is an outlet-opening 7 for melted solder, which escapes when permitted to do so by an automatic cut-off and feed, which we now describe. A pin 8, secured to the pot or its supporting-standard, is a pivot upon which is mounted a movable plate or cut-off 9, which extends beneath and across the bottom of the pot and projects beyond it. This plate has a hole 10, which is of proper size to supply the right amount of solder for a side seam. The cut-off 9 is held up against the bottom of the solder-pot and is also guided in its movement by a lower plate 11 beneath it. The latter is supported by the flanges 12 upon the arms 13, pivoted to the standard 2 and having a tension-spring 14 connected to their rear end and to some fixed part of the machine structure. This construction keeps plate 11 forced constantly up against the cut-off and holds the latter always in position and tight in spite of any expansion or contraction caused by changes of temperature and so prevents leakage of solder. A hole 15 is made in the plate 11, which is in line with the vertical hopper or passage 16, which extends through the horn and beneath which is the soldering bar or iron 17. If the feed device is to drop solder upon the side seam, of course the passage 16 would not be used, since the side seam will be above the horn in that case and some other arrangement of soldering-iron will be used adapted to an upwardly-presented seam. The construction of horn and soldering-iron shown in the drawings is intended to be in substantial accordance with the construction shown in the said patent of R. D. Hume for a soldering-machine, No. 640,136; but the elevated solder-pot for holding a body of melted solder and the cut-off and feed may evidently be adapted to other types of soldering-machines. We prefer to make the hopper 16 of metal to which solder will not adhere, tapering to a narrow outlet at the bottom and inserted and held in a correspondingly-shaped slot in the horn; but such a slot can be used without an independently-constructed hopper, although as the horn is hollow it is better to avoid any chances of the solder missing the bottom slot by providing a confined passage for such solder, which will insure its reaching the edge of the iron. The preferred construction of this hopper consists of a block 18 cast with a tapering hole or passage 19 and secured within the horn in any suitable way. Beneath is a loose block 20, having a tapering passage 21 through it, the upper end of which is wider than the discharge end of passage 19 and acts as a funnel to receive solder from the latter. The part 20 can rest upon the soldering-iron until raised by the oncoming can striking its curved or inclined lower edge 22. The melted solder is by this movable hopper not only delivered to exactly the right point on the iron, but is also confined to that point and prevented from spreading by the walls of passage 21. The solder-feed is automatically put in operation by the can-bodies passing along the horn, but is operated by a reciprocating rod 23, deriving its motion from the operating mechanism. A convenient way of driving this rod is to connect it to the brackets 24, which operate the can-body carriers or propelling devices by motion derived from a reciprocating side bar 25, connected to a driving-shaft. These connections are not shown in detail, as it is assumed that the rod 23 reciprocates. Upon this rod are adjustably secured the clamps 26 27. The cut-off 9 carries at its free end a pivoted dog 28, which is capable of being moved toward the horn in position to be struck by the clamp 26. This movement is produced by the oncoming can-body 29 through a trigger 30. The trigger is an angular lever pivoted at its angle to a bracket 31 of the main standard, as shown at 32. The heel 33 of this lever engages the under side of a laterally-extending pin 34 on the dog 28, and the other end 35 acts as a weight and normally enters a slot 36 in the horn and there rests with its pointed extremity 37 projecting above the horn toward the feed end of the machine. The can-body, catching under this extremity, lifts the trigger out of the slot and passes beneath it, closing the slot temporarily, so that the trigger cannot resume its normal position until the can has completely passed. As the trigger is thrown up the dog 28 drops down into the path of the clamp 26 and is struck by the latter, moving the cut-off plate. The melted solder which is in the hole 10 of the cut-off is carried with the cut-off until said hole 10 registers with the hole 15 in plate 11, through which the solder falls to its destination, which with the construction shown is the upper edge of the soldering-bar beneath the horn. On the back stroke of rod 23 (during which the can-body is at rest) the toe 38 on the clamp 27 strikes the cut-off and returns it to normal position in readiness to receive more solder from the melting-pot. The trigger 30 falls back to normal position by gravity and restores the dog 28 to its normal upraised position. The action of the automatic cut-off 9 is to supply only the exact quantity of solder for a seam at each feeding action, and this is accomplished by making the hole 10 in the cut-off slide of the proper size to receive just that amount. The cut-off, being always held up closely against the solder-pot, permits no leakage, excepting when the hole 10 in the cut-off registers with the outlet 7 from the solder-pot.

The reciprocating side bar 25 is formed with a cam 39 thereon, which is adapted to engage a roller 40, mounted in one end of a crank-arm 41 on a rock-shaft 42, extending transversely of the horn 1 on the under side thereof. Secured to said rock-shaft, on the end thereof opposite the crank-arm 41, is a frame 43, having a spring-supported pin 44 therein. The upper end of said pin 44 engages a pin or projection 45 on the under side of the soldering iron or bar 17 and serves to support the latter. The cam 39 on the reciprocating bar 25 is so disposed that when the can-body 29 reaches a point between the soldering-iron 17 and the movable block 20 of the hopper 16 it will engage the roller 40 and rock-shaft 42 and through the pins 44 and 45 lift the soldering-iron 17 until the upper surface thereof, on which the drop of solder is located, is forced into contact with the outer surface of the can-body along the seam. In this way the solder is applied to the seam, it being of course understood that it is spread throughout the length thereof by reason of the longitudinal movement of said can-body.

The operation of spreading the solder upon the seam is performed by the soldering-iron as the can moves in contact with it, but forms no part of the present invention. Such operation in a machine of the type shown is fully described in the patent to Robert D. Hume, previously referred to.

The two parts 18 and 20 of the hopper 16 are secured in the horn 1 by the frictional engagement of the outer inclined walls of said blocks with the inner surfaces of the inclined plates 46, secured in said horn. By this construction separate connecting means are dispensed with. The blocks are securely held in position, but may be removed when desired by simply tapping the same. These blocks, as stated, are constructed of a material to which the melted solder will not adhere, so that all of the charge delivered by the cut-off 9 through the opening 15 will drop upon the iron 17, through which it is applied to the moving can-bodies. The lower block 20 is formed on its under side with a groove or channel 49, which receives the projection on the inner surface of the can-body formed by the bend made to create the seam.

We have illustrated in the drawings gas or vapor fuel supply pipes 50 50 on opposite sides of the iron 17, the same being provided with discharge-orifices for the purpose of forcing a jet of flame against the opposite sides of the iron 17. Both the solder-pot 3, therefore, and the soldering-iron 17 are heated. As the solder is supplied to the iron 17 in a molten condition, it is not necessary that said iron should be heated to such a high degree as if it were necessary to melt the solder thereby, as is the case when strips of solder-wire are supplied to the iron. The danger of overheating the parts, therefore, including the horn 1, is reduced to a minimum and the speed of operation is greatly facilitated.

The advantages of the present construction lie mainly in the fact that the use of solder-wire, together with mechanism for holding, cutting, and feeding it, is dispensed with. A gas-supply being always furnished for heating a tank or a soldering-iron, to which cut solder is fed, it is perfectly practicable to furnish gas heat to a solder-pot above the can mechanism and supply melted solder in the first place. This being done by the described apparatus in regulated quantity and without leakage, there results a considerable saving in the expense of operation of soldering-machines. In addition it is evidently practicable to run the machines at somewhat-higher speed when melted solder is originally supplied, as wire-solder delivered to an iron or to a can-seam requires an appreciable time for melting, which must be taken into consideration in running the machine.

This invention is not limited to details of construction and arrangement herein described and shown in the drawings, as it is desired to obtain the benefits of such modifications and equivalents as fall properly within the spirit of the invention.

Having thus fully described our invention, what we claim as new, and desire to secure by Letters Patent, is—

1. In a soldering-machine, a support for can-bodies along which such can-bodies are moved, in combination with an elevated solder-pot, means for heating such pot, and a transversely-movable feed and cut-off device for supplying regulated quantities of melted solder from such pot.

2. In a soldering-machine, a support for can-bodies along which such can-bodies are moved, in combination with an elevated solder-pot, means for heating the same, a transversely-movable feed and cut-off device, means for operating such device, and means operated by the passage of a can-body for enabling such device to be operated.

3. In a soldering-machine, a horn having a vertical passage through it, a soldering-iron beneath the same, an elevated solder-pot having heating means, an automatic feed and cut-off for alternately feeding and holding back the solder, and means for discharging such solder through the passage in the horn and upon the said iron.

4. In a soldering-machine, a horn, an elevated solder-pot having an outlet-opening, a cut-off slide having an opening adapted to register with the outlet in said pot, a guide-plate beneath said cut-off having a solder-outlet, and means for moving the cut-off with the solder confined in the hole in said cut-off, and causing said hole to register with the outlet in the said guide-plate.

5. In a soldering-machine, a solder-pot, a cut-off beneath said solder-pot, a plate beneath said cut-off, means for pressing said plate constantly against said cut-off, discharge-openings in said pot and said plate, and a hole in said cut-off adapted to register alternately with said discharge-openings.

6. In a soldering-machine, the combination with a horn along which can-bodies are propelled, of an elevated pot for containing melted solder, a feeding and cut-off device, a movable bar for operating said device in opposite directions, a dog on said device normally out of the path of movement of said bar, and means operated by a moving can-body for placing said dog in the path of movement of said bar.

7. In a soldering-machine, the combination with a horn along which can-bodies are moved, of an elevated pot for melted solder, a movable cut-off, a movable bar for operating said cut-off in opposite directions, a dog on said cut-off, and a trigger connected to said dog, and normally in the path of the moving can-body; whereby said trigger, when moved by the can-body, places said dog in position to be operated by said bar.

8. In a soldering-machine, a horn, an elevated pot for melted solder, a sliding cut-off for alternately holding and permitting the escape of solder from said pot, a pivoted dog on said cut-off, a movable bar for operating said cut-off in opposite directions, a trigger-lever and a slot in the horn in which the end of said trigger-lever normally rests; whereby the moving can, striking said trigger-lever, places said dog in position to be struck and moved by said bar.

9. In a soldering-machine, a solder-pot, a cut-off slide, a guide-plate for said slide, a pivoted support for said guide-plate and a spring for forcing it against said guide-plate, the said pot, slide and guide-plate being provided with solder holes or passages.

10. In a soldering-machine, the combination with the solder-pot, of a sliding cut-off, a guide-plate between which and the bottom of the pot said cut-off is confined, and spring-actuated levers bearing against said guide-plate.

11. In a soldering-machine, a slotted horn, in combination with a solder guide or hopper held loosely therein, substantially as and for the purposes set forth.

12. In a soldering-machine, a slotted horn, a soldering-iron beneath it, and a solder guide or hopper held loosely in the horn, and adapted to rest normally upon said iron.

13. In a soldering-machine, a slotted horn, a solder guide or hopper therein, comprising a fixed and a loose member having registering passages for solder, and means for supplying solder to said hopper.

14. In a soldering-machine, the combination with a horn, of a solder guide or hopper, comprising a fixed member having a tapering passage, and a movable member having a tapering passage whose inlet is wider than the outlet from the fixed member.

In testimony whereof we have hereunto set our hands in presence of two subscribing witnesses.

CHARLES S. WINSOR.
OTTO E. J. SMITH.

Witnesses:
JOHN R. SMITH,
JOHN MAXWELL.